United States Patent
Moorman

[11] Patent Number: 6,162,147
[45] Date of Patent: Dec. 19, 2000

[54] AUTOMATIC TRANSMISSION HYDRAULIC CIRCUIT

[75] Inventor: Steven Patrick Moorman, Dexter, Mich.

[73] Assignee: General Motors Corporation, Detroit, Mich.

[21] Appl. No.: 09/546,011

[22] Filed: Apr. 10, 2000

Related U.S. Application Data

[62] Division of application No. 09/347,543, Jul. 6, 1999.

[51] Int. Cl.$^7$ .......................... F16H 61/04; F16D 19/00; F16L 55/04
[52] U.S. Cl. .......................... 477/150; 192/85 R; 138/31
[58] Field of Search .......................... 192/85 R, 85 AA; 477/150, 151, 152, 86; 137/565.34; 138/31

[56] References Cited

U.S. PATENT DOCUMENTS

| | | |
|---|---|---|
| 4,161,895 | 7/1979 | Ushijima et al. .......................... 477/150 |
| 5,050,460 | 9/1991 | Sugano .......................... 477/150 X |
| 5,090,270 | 2/1992 | Suzuki .......................... 477/152 X |
| 5,105,922 | 4/1992 | Yant .......................... 192/85 R X |
| 5,148,834 | 9/1992 | Reinartz et al. .......................... 138/31 |
| 6,065,814 | 5/2000 | Nishii et al. .......................... 138/31 X |

*Primary Examiner*—Charles A Marmor
*Assistant Examiner*—Roger Pang
*Attorney, Agent, or Firm*—Laura C. Wideman

[57] ABSTRACT

A hydraulic circuit for an automatic transmission operable to reduce time delay in shifting includes a source supplying pressurized fluid through a feed orifice and a charging circuit including an accumulator. The accumulator is downstream of the feed orifice, and operates to reserve pressurized fluid supplied by the source. The hydraulic circuit also includes a clutch circuit, downstream of the charging circuit, which has a clutch hydraulically actuated and operable to generate torque to shift the automatic transmission. A valve is interposed between the charging circuit and the clutch circuit to open a flow path therebetween to start a shift cycle of the clutch. When the valve is actuated, the pressurized fluid is released from the accumulator and flows to the clutch circuit to minimize delay in the shift.

2 Claims, 3 Drawing Sheets

AUTOMATIC TRANSMISSION HYDRAULIC CIRCUIT

This is a division of application Ser. No. 09/347,543 filed Jul. 6, 1999.

TECHNICAL FIELD

The invention is directed to a clutch and accumulator hydraulic circuit of an automatic transmission.

BACKGROUND OF THE INVENTION

In a traditional hydraulic system for an automatic transmission clutch, fluid enters the system through a feed orifice upon actuation of a valve. The fluid flows to the clutch and strokes the clutch piston, against counteracting spring forces, to contact a clutch pack. The fluid also flows into an accumulator, against a counteracting spring force, to control the rise of pressure in the circuit. This controlled pressure rise results in a controlled rise in torque capacity in the clutch to achieve the desired shift feel.

Hydraulic circuits inherently have a delay between the time a valve is actuated to energize the circuit and the time the circuit reaches the desired pressure due to fluid and system restrictions. The automatic transmission experiences such a delay during shifting.

The shift cycle includes a delay phase and a shift phase, where the delay phase is defined as the time between valve actuation and when the clutch piston strokes to contact the clutch pack, initiating the shift. The shift phase is the development of torque capacity in the clutch thereby executing the transmission shift. The delay is a function of the flow directed to stroke the clutch piston and the displacement of the piston before contacting the clutch pack. In circuits where short delays are critical, the feed orifice is sized sufficiently large and correspondingly the accumulator must be of a larger size to accommodate the larger volume of fluid. High flow rates and large accumulator volumes have disadvantages such as greater pressure drops across circuit restrictions and greater packaging requirements, respectively.

Another way to reduce shift delay is by increasing feed flow by introducing high pressure pulses for short time periods or using pressure pulses to open a valve to bypass the restrictive feed orifice when a feed pressure level is exceeded. Such a system requires high pressures that may be difficult to generate. Further, pressure control requires complex, adaptive algorithms to ensure proper timing of the pulse relative to the end of the delay phase.

In reducing the delay phase, one must also consider the requirements of the shift phase. Once the shift begins, the rate of increase in the system pressure must be controlled. If the rate is too great, then clutch pressure and therefore clutch torque capacity will increase too quickly, resulting in a hard-feeling shift. Likewise if the rate of increasing clutch torque capacity is too slow, then the shift may feel as though it is dragging.

SUMMARY OF THE INVENTION

The present invention provides for a charged hydraulic system to be applied in an automatic transmission clutch to reduce shift delay. It functions to deliver a "burst" of pressurized oil into the clutch circuit to stroke the clutch. This is accomplished by energizing a charging accumulator, located downstream of a feed orifice, with a volume of pressurized fluid prior to the opening of the fluid path to the clutch. Since the accumulated fluid is stored downstream of the feed orifice, when the flow path is opened, the pressure differential between the accumulator and the clutch promotes unrestricted fluid flow out of the accumulator to the clutch. This unrestricted pressurized volume of oil increases the flow rate to reduce the delay phase of the shift.

The accumulator also provides the traditional function of controlling the rise in clutch torque capacity to achieve the desired shift feel. By refilling, and thus recharging, the accumulator during the clutch shift phase, the rise in system pressure is controlled thereby controlling the rise in clutch pressure.

The hydraulic system does not rely on having enough pump capacity to support higher pressures. Further, no timing control algorithms, nor additional hardware beyond a traditional circuit, are required.

DESCRIPTION OF THE PREFERRED EMBODIMENT

Figure 1:
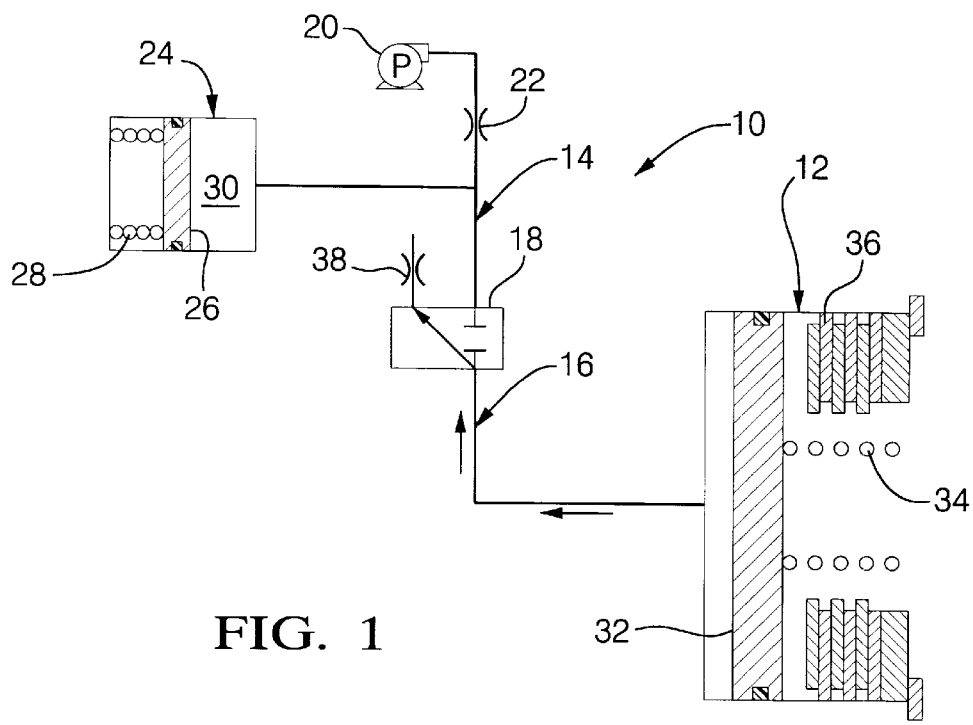
FIG. 1 is a schematic view of a hydraulic system for an automatic transmission embodying the present invention prior to initiating a shift cycle.

FIG. 1 schematically illustrates a hydraulic circuit 10 for support of an automatic transmission clutch 12 where the hydraulic circuit comprises a charging circuit 14 and a clutch circuit 16 with a shift valve 18 interposed therebetween. The shift valve 18 controls when fluid flows from the charging circuit 14 to the clutch circuit 16.

A pressurized fluid feed source, such as a pump, 20 introduces pressurized fluid to the charging circuit 14 through a feed orifice 22 which is in fluid communication with an accumulator 24 and the shift valve 18. The accumulator 24, which is downstream of the feed orifice 22 but upstream of the shift valve 18, includes an accumulator piston 26 which is stroked against the force of an accumulator spring 28 by the pressurized fluid from feed source 20 to create a varying volume fluid reservoir 30. Downstream of the shift valve 18, the clutch circuit 16 delivers fluid to the clutch 12. The clutch 12 includes a clutch piston 32 which is stroked against clutch spring 34 until the clutch piston contacts and compresses a multi-disc clutch pack 36.

Prior to initiating a shift, referred to as the shift cycle, the charging circuit 14 is in the charged state as illustrated in FIG. 1. The accumulator reservoir 30 reserves pressurized fluid to be used in charging the clutch circuit 16 upon initiation of the shift cycle.

The shift cycle is described as having a delay phase and a shift phase where the delay phase is defined as the time between actuation of the shift valve 18 and when the clutch piston 32 contacts the clutch pack 36 initiating the shift. The shift phase is the development of torque capacity in the clutch 12 through increasing pressure between the clutch piston 32 and the clutch pack 36.

Figure 2:
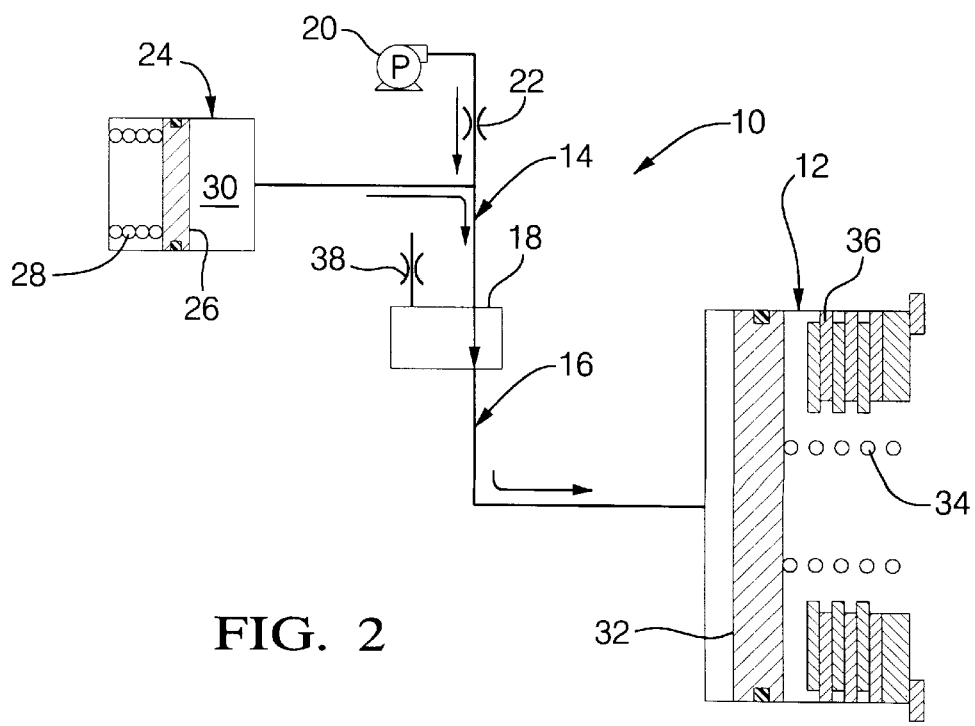
FIG. 2 is a schematic view of the system of FIG. 1 at the initiation of the shift cycle.

When the shift cycle is initiated as shown in FIG. 2, the shift valve 18 is actuated by a known means to provide a flow path from the charging circuit 14 to the clutch circuit 16. Since the reserved fluid in the accumulator 24 is stored downstream of the feed orifice 22, the pressure differential between the charging circuit 14 and the clutch circuit 16 induces fluid flow out of the accumulator, with minimal restriction, to the clutch 12. The release of the stored, pressurized volume of fluid from the accumulator 24 provides a sufficient, unrestricted flow to reduce the delay phase. As fluid flows out of the accumulator 24, the accumulator spring 28 moves the accumulator piston 26, thereby reducing the size of the reservoir 30. Concurrently, flow enters the hydraulic circuit 10 through feed orifice 22. The combined flow from the feed orifice 22 and the accumulator 24 causes the clutch piston 32 to stroke rapidly until the pressure at the shift valve 18 and accumulator are equalized. At this point, flow from the accumulator 24 ceases as there is no longer a pressure differential to induce flow.

Figure 3:
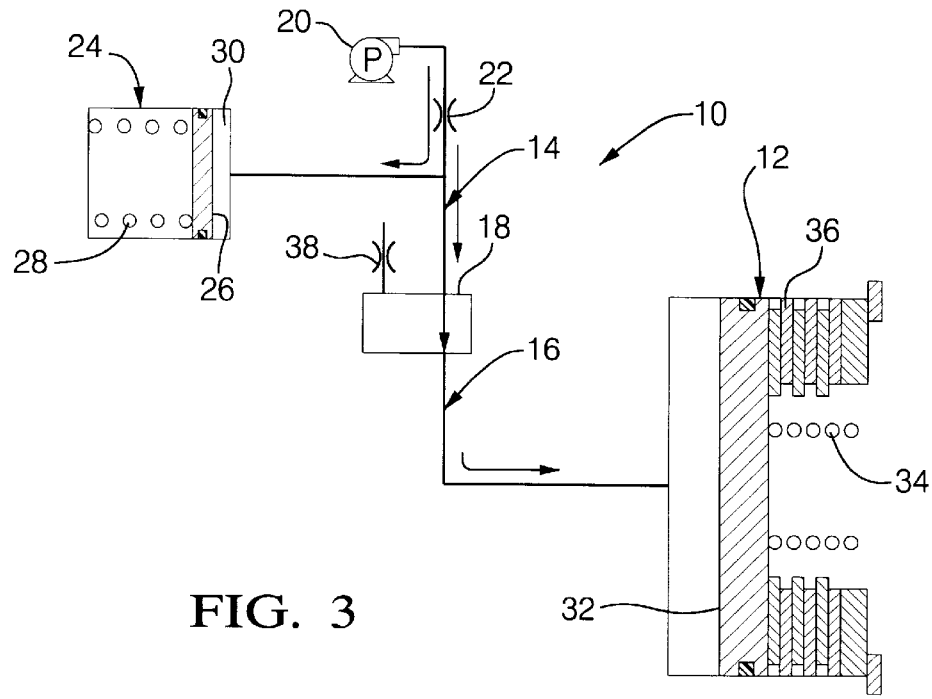
FIG. 3 is a schematic view of the system of FIG. 2 near the end of the shift cycle.

Once the clutch piston 32 contacts the clutch pack 36, the shift phase begins as illustrated in FIG. 3. Fluid entering the hydraulic circuit 10 through the feed orifice 22 is distributed to both the accumulator 24 and the clutch circuit 16. The pressurized fluid strokes the accumulator piston 26, increasing the volume of the reservoir 30, to control the rise in accumulator pressure, and likewise to control the rise in clutch pressure. The rate at which the clutch pressure increases directly affects the rate at which the clutch 12 generates torque, which impacts the feel of the shift to a vehicle driver. If the rate of pressure increase in the clutch 12 is too rapid, then the rate of increasing torque capacity may also be too fast resulting in a hard-feeling shift.

When the clutch is no longer needed to be actuated, the shift valve 18 is de-energized to close the flow path between the charging and clutch circuits 14 and 16 and the system 10 returns to the state illustrated in FIG. 1. Fluid flows out of clutch 12 through exhaust line 38. The accumulator fluid reservoir 30 is fully charged with pressurized fluid and prepared to charge the clutch circuit 16 for the next shift cycle.

The accumulator 24 in this embodiment provides a dual function. During the delay phase, it produces an unrestricted and therefore greater flow of fluid to the clutch 12 thereby minimizing shift delay. During the balance of the shift, it provides a controlled pressure rise in the clutch circuit 16 and consequently a controlled rise in the clutch torque capacity to achieve the desired shift feel.

Figure 4:
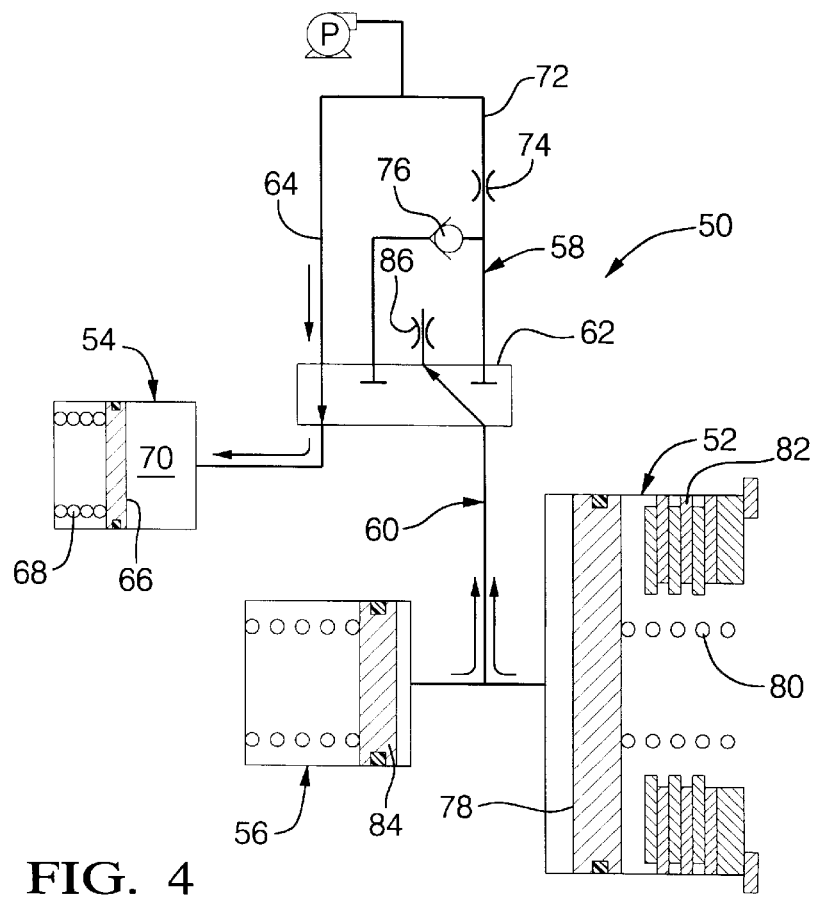
FIG. 4 is a schematic view of a second embodiment of the present invention for a hydraulic system for an automatic transmission prior to initiating a shift cycle.

FIG. 4 schematically illustrates a second embodiment for a hydraulic circuit 50 to support an automatic transmission clutch 52. This embodiment allows independent control of the fluid flow during the delay phase and the system pressure rise during the shift phase by providing two independent accumulators, referred to as the charging accumulator 54 and the pressure-controlling accumulator 56. The hydraulic circuit 50 comprises a charging circuit 58 and a clutch circuit 60 with a shift valve 62 interposed therebetween.

The charging circuit 58 includes a pressurized fluid feed line 72 to introduce pressurized fluid through a feed orifice 74, which is in fluid communication with the shift valve 62. The charging circuit 58 also includes the charging accumulator 54, which receives pressurized fluid from a charging pressurized line 64. The charging accumulator 54 includes an accumulator piston 66 which is stroked against the force of an accumulator spring 68 by the pressurized fluid to create a fluid reservoir 70. The charging accumulator 54 delivers fluid downstream of feed orifice 74. A one-way check valve 76 is disposed between the charging accumulator 54 and the feed orifice 74 to prohibit fluid flow from the pressurized fluid feed line 72 to the charging accumulator 54.

Downstream of the shift valve 62, the clutch circuit 60 delivers fluid to the clutch 52 and to the pressure-controlling accumulator 56. The clutch 52 includes a clutch piston 78 which is stroked against a clutch spring 80 until the clutch piston contacts and compresses a multi-disc clutch pack 82.

Prior to initiating a shift, referred to as the shift cycle, the charging circuit 58 is in the charged state as illustrated in FIG. 4. The charging accumulator reservoir 70 reserves pressurized fluid to be used in charging the clutch circuit 60 upon initiation of the shift cycle.

Figure 5:
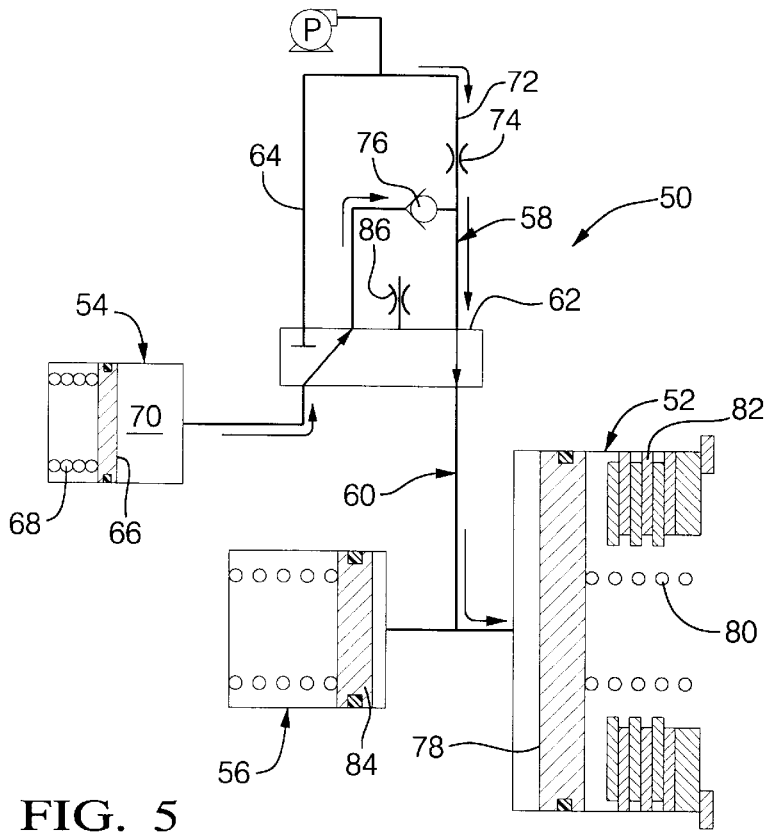
FIG. 5 is a schematic view of the system of FIG. 4 at the initiation of the shift cycle.

When the shift cycle is initiated as shown in FIG. 5, the shift valve 62 is actuated to provide a flow path from the charging circuit 58 to the clutch circuit 60. Opening the shift valve 62 releases the stored volume of pressurized fluid in the fluid reservoir 70 of the charging accumulator 54. This released fluid flow allows unrestricted flow and reduces the delay time due to its location downstream of the feed orifice 74. The pressurized fluid feed line 72 supplies pressurized flow through feed orifice 74 where the combined flow, from the feed orifice 74 and the charging accumulator 54, causes the clutch 52 to stroke rapidly until the pressure at the shift valve 62 and charging accumulator are equalized. The one way check valve 76 prevents scavenging of fluid by the charging accumulator 54. Instead, flow is directed only to the clutch circuit 60.

Figure 6:
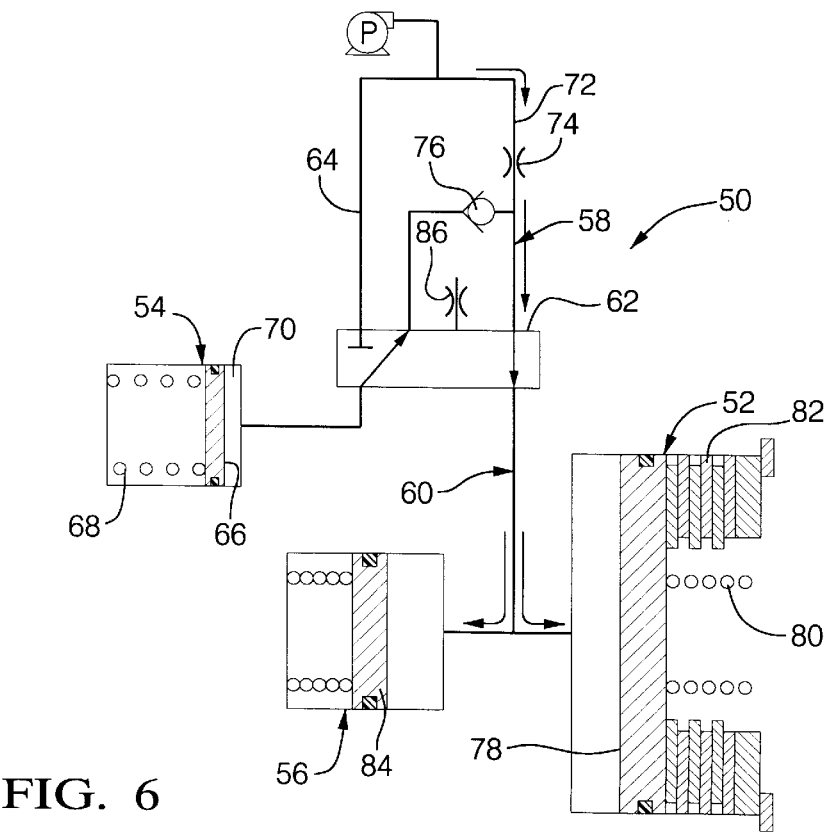
FIG. 6 is a schematic view of the system of FIG. 5 near the end of the shift cycle.

After completely stroking the clutch piston 78, signaling the start of the shift phase as illustrated in FIG. 6, the pressure-controlling accumulator 56 controls the rise of pressure in the charging circuit 58 by accommodating a portion of the fluid flow through the stroking of a pressure-controlling piston 84. This controls the rise in clutch pressure and therefore the development rate of clutch torque capacity to achieve the desired shift feel.

When the clutch is no longer needed to be actuated, the shift valve 62 closes the flow path between the charging circuit 58 and clutch circuit 60 and the system 50 returns to the state in FIG. 4. Fluid flows out of clutch 52 through exhaust line 86. The shift valve 62 also opens the path from the charging pressurized line 64 to the charging accumulator 54 to refill the charging accumulator reservoir 70 with pressurized fluid and prepare it for charging the clutch circuit 60 upon the next shift initiation.

This hydraulic circuit 50 provides for independent tuning of the delay phase and the controlled pressure rise phase of the shift. The charging accumulator 54 may be sized with respect to the requirements for the delay phase and without regard for the shift phase requirements. Likewise the pressure-controlling accumulator 56 may be sized with respect to the desired rise in clutch pressure during the shift phase without regard to the delay phase.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A hydraulic circuit for an automatic transmission comprising a charging circuit including a pressurized fluid feed line supplying pressurized fluid through a feed orifice, a charging accumulator having a variable volume fluid reservoir to reserve pressurized fluid supplied by a charging pressure line, and a one way check valve down stream of said feed orifice to prohibit flow from said pressurized fluid feed line to said charging accumulator, said hydraulic circuit further comprising a clutch circuit, downstream of said charging circuit, including a clutch operable to transfer torque to shift the automatic transmission, and a pressure-controlling accumulator operable to accommodate fluid, and a valve interposed between said charging circuit and said clutch circuit, operable to open a flow path therebetween to start a shift cycle of said clutch, where upon actuation of said valve, the pressurized fluid is released from said fluid reservoir of said charging accumulator and flows to said clutch circuit to minimize delay in the shift cycle, and fluid flows unrestricted from said feed orifice to said clutch and to said pressure-controlling accumulator to control the rise in pressure in said clutch circuit thereby controlling the rise in torque capacity of said clutch during the shift.

2. A hydraulic circuit for an automatic transmission, as defined in claim 1, wherein said pressure-controlling accumulator comprises a pressure-controlling piston which operates to stroke at a rate to control the pressure rise in said clutch circuit during the shift.

* * * * *